(12) United States Patent
Nakajima et al.

(10) Patent No.: US 7,518,640 B2
(45) Date of Patent: Apr. 14, 2009

(54) METHOD, APPARATUS, AND RECORDING MEDIUM FOR GENERATING ALBUM

(75) Inventors: Nobuyoshi Nakajima, Kaisei-machi (JP); Akira Yoda, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 823 days.

(21) Appl. No.: 09/837,198

(22) Filed: Apr. 19, 2001

(65) Prior Publication Data

US 2001/0048802 A1  Dec. 6, 2001

(30) Foreign Application Priority Data

Apr. 19, 2000  (JP)  ............... 2000-117669
Mar. 19, 2001  (JP)  ............... 2001-078019

(51) Int. Cl.
  *H04N 5/76*  (2006.01)
(52) U.S. Cl. ............ 348/231.2; 348/231.3; 348/333.05; 348/333.02
(58) Field of Classification Search ............ 348/231.2, 348/231.3, 231.4, 231.5, 231.6, 231.99, 239
See application file for complete search history.

(56) References Cited

U.S. PATENT DOCUMENTS

| 4,011,571 | A | * | 3/1977 | Okuzawa | ............ | 396/291 |
| 5,477,264 | A | * | 12/1995 | Sarbadhikari et al. | ..... | 348/231.6 |
| 5,633,678 | A | * | 5/1997 | Parulski et al. | ............ | 348/231.5 |
| 6,166,763 | A | * | 12/2000 | Rhodes et al. | ............ | 348/143 |
| 6,229,566 | B1 | * | 5/2001 | Matsumoto et al. | ...... | 348/231.2 |
| 6,434,579 | B1 | * | 8/2002 | Shaffer et al. | ............ | 715/520 |
| 6,504,960 | B2 | | 1/2003 | Takahashi | | |
| 6,727,909 | B1 | * | 4/2004 | Matsumura et al. | ......... | 345/629 |
| 6,999,637 | B1 | * | 2/2006 | Anderson et al. | ........... | 382/311 |

FOREIGN PATENT DOCUMENTS

| JP | A3274047 | 12/1991 |
| JP | A3274857 | 12/1991 |
| JP | A7184032 | 7/1995 |
| JP | 9198392 | 7/1997 |
| JP | A1051576 | 2/1998 |
| JP | 11127323 | 5/1999 |
| JP | 2000-299777 A | 10/2000 |

* cited by examiner

*Primary Examiner*—Ngoc-Yen T Vu
*Assistant Examiner*—Nicholas G Giles
(74) *Attorney, Agent, or Firm*—Birch, Stewart, Kolasch & Birch, LLP

(57) ABSTRACT

A workload on a user for selecting and arranging images used for album generation is reduced. Images necessary for generating an album are photographed and image data sets representing the images and accompanying information thereof are recorded in a recording medium. Data reading means reads the image data sets and the accompanying information. A template to be used for album generation is also read from template storing means. The images can be inserted in image insertion areas of the template in photographing order. With reference to the accompanying information, the images are inserted in the image insertion areas in photographing order and composite image data are generated. A printer prints the composite image data as the album.

27 Claims, 15 Drawing Sheets

FIG. 13

| TEMPLATES IMAGE INSERTION AREAS | (1) | (2) | (3) | (4) |
|---|---|---|---|---|
| I | Fa1, Fc1 | Fb1, Fd1 | — | — |
| II | Fa2, Fd2 Fb2 | Fa1, Fd1, Fb1 | Fa3, Fd3, Fb3 | — |
| III | Fe1, Fg2 | Ff1, Fg1 | — | — |
| IV | Ff1, Fa3 Fb2 | — | — | — |
| V | Fc1(s=w) | Fb1(s=w), Fd1(s=w) | — | — |
| VI | Ff1(s=w, w=r or s), Fa3(s=w, w=s) | — | — | — |

TEMPLATE I

IMAGE INSERTION AREA (1)
    RECOMMENDED COMPOSITION ID : Fa1, Fc1
IMAGE INSERTION AREA (2)
    RECOMMENDED COMPOSITION ID : Fb1, Fd1
RECOMMENDED SEASON : all
SECOMMENDED WEATHER : all

TEMPLATE VI

IMAGE INSERTION AREA (1)
    RECOMMENDED COMPOSITION ID : Ff1
    RECOMMENDED SEASON : winter
    RECOMMENDED WEATHER : rain, sunny
    RECOMMENDED COMPOSITION ID : Fa3
    RECOMMENDED SEASON : winter
    SECOMMENDED WEATHER : sunny

METHOD, APPARATUS, AND RECORDING MEDIUM FOR GENERATING ALBUM

BACKGROUND OF THE INVENTION

1. Field of the Invention

The present invention relates to a method and an apparatus for generating an album by arranging a plurality of images obtained by a digital camera in a desired layout. The present invention also relates to a computer-readable recording medium storing a program to cause a computer to execute the album generation method.

2. Description of the Related Art

Various methods of generating an album by arranging a plurality of images obtained by photographing in a desired layout have been proposed. For example, in a method proposed in Japanese Unexamined Patent Publication No. 3(1991)-274047, images in frames of a film and photographing direction information recorded for each of the frames are read, and the images laid out on one sheet are printed by adjusting orientation of each of the frames based on the photographing direction information. Another method comprising the steps of reading photographing information recorded for each of frames at the time of photographing and laying out the information together with images of the frames to generate an album has also been proposed (Japanese Unexamined Patent Publication No. 3(1991)-274857). Furthermore, a method of generating an album by arranging images owned by a user in a desired layout and by further inserting characters and items of clip art has been known (Japanese Unexamined Patent Publication No. 7(1995)-184032). However, in these methods, the layout needs to be specified manually by a user, which leads to a complicated layout operation.

Therefore, another method of generating an album easing layout operation has been proposed (Japanese Unexamined Patent Publication No. 10(1998)-51576). In this method, upon printing a plurality of images on one sheet for generating an album, a user specifies the images to be printed and a layout thereof by using a mark sheet or the like, and information specifying the images and the layout is obtained by reading the mark sheet. Based on the information, the images are read from a film and the album having the images laid out therein is generated. According to this method, the user can obtain the album having the images by only specifying the images to be printed and where the images are arranged in the album.

However, in the method described in Japanese Unexamined Patent Publication No. 10(1998)-51576, the layout needs to be specified by a user. Since an impression of an album changes depending on how images are laid out therein, a user needs to spend time on a layout in order to obtain an album giving a preferable impression. If the user does not spend this time on the layout, only an album giving an ordinary impression is generated.

SUMMARY OF THE INVENTION

The present invention has been conceived based on consideration of the above problem. An object of the present invention is therefore to provide a method and an apparatus for generating an album giving a preferable impression without spending much time thereon, and to provide a computer-readable recording medium storing a program to cause a computer to execute the album generation method.

An album generation method of the present invention is a method of generating an album comprising a composite image in which a plurality of images obtained by a digital camera are arranged in a desired layout. In this method, the digital camera comprises image recording means for recording image data sets representing the images in a recording medium with accompanying information regarding the image data sets added thereto, and the method comprises the steps of:

reading the image data sets and the accompanying information added thereto from the recording medium; and generating composite image data representing the composite image based on the accompanying information by inserting the respective images represented by the image data sets in image insertion areas of a template having the image insertion areas corresponding to the accompanying information.

The "accompanying information" refers to information on the image data sets and can be added to the image data sets by the digital camera. The date of photographing, a location of photographing, the kind of a subject, and a comment on a scene can be included as the accompanying information.

For "recording the image data sets in a recording medium with accompanying information added thereto", various methods can be used. For example, the accompanying information is recorded in a file header of each of the image data sets, or together with the image data sets in the same file such as a FlashPix file. Alternatively, the accompanying information and the image data sets are recorded in separate files by being related to each other. In the case where image data sets that are not used for an album are recorded in the recording medium, the accompanying information includes information indicating whether or not each of the image data sets is used for the album.

The "recording medium" can be a portable recording medium such as a memory card, an FD, or an MO disc. Alternatively, the recording medium can be a hard disc of a personal computer. The accompanying information and the image data sets are read from a portable recording medium by using a memory card reader or an FD drive, for example. Alternatively, the accompanying information and the image data sets are read from a hard disc of a personal computer via a network.

The "template" has the image insertion areas for insertion of the images in a desired layout. The image insertion areas are related to the accompanying information of the image data sets, and the images represented by the image data sets added with the accompanying information corresponding to the respective image insertion areas are inserted therein. Not only the images but also a prepared comment on the images, a comment based on the accompanying information, and a clip art can be inserted, for example. Furthermore, the template may be recorded in the recording medium having the accompanying information and the image data sets or in another recording medium, and the template is read at the time of album generation. Alternatively, information specifying the template may be recorded in a recording medium described above so that the template can be read from template storing means such as a database storing a plurality of templates, with reference to the information specifying the template.

In the album generation method of the present invention, the template may be selected based on the accompanying information.

Furthermore, in the album generation method of the present invention, the composite image data may be generated by inserting the accompanying information together with the images in the template.

In the album generation method of the present invention, it is preferable for the digital camera to further comprise:

photographing means for obtaining image data representing a subject by photographing the subject;

storage means for storing recommended composition data sets representing images of recommended composition at various photographing locations by relating photographing information including location information representing the photographing locations to the recommended composition data sets;

photographing information obtaining means for obtaining acquired photographing information;

reading means for reading a desired one of the recommended composition data sets related to the photographing information corresponding to the acquired photographing information from the storage means, based on the acquired photographing information obtained by the photographing information obtaining means; and display means for displaying a recommended composition image represented by the desired recommended composition data set in superposition on an image represented by the image data obtained by the photographing means. In this case, the image recording means includes the acquired photographing information in the accompanying information and adds the accompanying information to the image data obtained by the photographing means based on the recommended composition. In this manner, a plurality of sets of the image data having the accompanying information are recorded in the recording medium.

The "storage means" may be a portable recording medium storing the recommended composition data sets for each photographing area or photographing purpose, or a recording medium wherein the recommended composition data sets can be rewritten.

The "recommended composition" refers to an image representing a notable scene or building to be photographed, for example. The recommended composition data sets may represent the recommended composition in color. However, in order to reduce the amount of data, image data having reduced contrast, binary image data, or monochrome image data may be used as the recommended composition data sets.

The "acquired photographing information" includes the location information representing the locations, information representing directions, information indicating the time and date, and weather information representing weather at the time of photographing, for example. Based on the acquired photographing information, the desired one of the recommended composition data sets can be read.

In this case, the "accompanying information" includes not only the location information, the direction information, the time and date information, and the weather information, but also a photographing condition (such as a focal distance and a diaphragm value) and a recommended composition ID indicating the recommended composition data set that has been read.

As the "display means", various means may be used. For example, a finder of a camera, or a liquid crystal display monitor thereof can be used.

In some cases, the image obtained by photographing according to the recommended composition is blurred or not preferable due to poor exposure or unfavorable weather, for example. In such a case, it is preferable for the image data representing the undesired image to be replaced with prepared image data corresponding to the recommended composition.

An album generating apparatus of the present invention is an apparatus for generating an album having a composite image in which a plurality of images obtained by a digital camera are arranged in a desired layout. The digital camera comprises image recording means for recording image data sets representing the images and having accompanying information regarding the image data sets in a recording medium. The album generating apparatus comprises:

reading means for reading the image data sets and the accompanying information added thereto from the recording medium; and composition means for generating composite image data representing the composite image based on the accompanying information by inserting the respective images represented by the image data sets into image insertion areas of a template having the image insertion areas corresponding to the accompanying information.

It is preferable for the album generating apparatus of the present invention to further comprise template selecting means for selecting the template based on the accompanying information.

Furthermore, in the album generating apparatus of the present invention, it is preferable for the composition means to generate the composite image data by inserting the accompanying information in the template in addition to the images.

In the album generating apparatus of the present invention, it is preferable for the digital camera to further comprise:

photographing means for obtaining image data representing a subject by photographing the subject;

storage means for storing recommended composition data sets representing images of recommended composition at various photographing locations by relating photographing information including location information representing the photographing locations to the recommended composition data sets;

photographing information obtaining means for obtaining acquired photographing information;

reading means for reading a desired one of the recommended composition data sets related to the photographing information corresponding to the acquired photographing information from the storage means, based on the acquired photographing information obtained by the photographing information obtaining means; and display means for displaying a recommended composition image represented by the desired recommended composition data set in superposition on an image represented by the image data obtained by the photographing means. In this case, the image recording means includes the acquired photographing information in the accompanying information and adds the accompanying information to the image data obtained by the photographing means based on the recommended composition. In this manner, a plurality of sets of the image data having the accompanying information are recorded in the recording medium.

In this case, it is preferable for the composition means to enable replacement of the image data obtained according to the desired recommended composition data set with prepared image data corresponding to the desired recommended composition data set.

The album generation method of the present invention may be provided as a program recorded in a computer-readable recording medium to cause a computer to execute the method.

According to the present invention, the image data sets are obtained by photographing the images with the digital camera, and the accompanying information related to the image data sets is recorded in the recording medium by being added to the image datasets. The image data sets and the accompanying information are read from the recording medium, and the images represented by the image data sets are inserted in the respective image insertion areas of the template with reference to the accompanying information. Since the template has the image insertion areas set in accordance with the accompanying information, the image data sets can be related to the image insertion areas of the template according to the accompanying information. The images are inserted in the respective image insertion areas corresponding thereto, and the composite image is generated. In this manner, a user can generate the composite image data by simply recording the image data sets having the accompanying information added thereto in the recording medium at the time of photographing with the digital camera and by selecting the template. Therefore, the user can obtain the album giving a preferable impression by printing the composite image data, without spending time on the layout.

Furthermore, by inserting the accompanying information in the template together with the images, information on the images inserted in the image insertion areas of the template can be recognized in the album.

Moreover, the acquired photographing information including the location information representing the location of a photographer (the user) having the digital camera is obtained by the photographing information obtaining means, and the desired recommended composition data set related to the photographing information corresponding to the acquired photographing information is read from the storage means based on the acquired photographing information. The recommended composition image represented by the recommended composition data set and the image represented by the image data obtained by the photographing means are superposed and displayed on the display means. The recommended composition data set is related to the photographing information including the location information representing the photographing location. The recommended composition data set also represents the image of the recommended composition at the photographing location. Therefore, the recommended composition image displayed on the display means represents the recommended composition image to be photographed at the location of the photographer having the digital camera. The photographer can therefore confirm the image necessary for the album at his/her location by viewing the display means, and photographing can be carried out by using the recommended composition regardless of the skills of the photographer if the photographer only causes the image represented by the image data obtained by the photographing means to agree with the recommended composition image. In this manner, photographing can be carried out without losing a chance to photograph the image necessary for the album. Moreover, since the acquired photographing information is included in the accompanying information, the layout of the images in the template can be determined based on the photographing information, by relating the photographing information to the respective image insertion areas of the template.

In some cases, the image obtained by photographing according to the recommended composition is blurred or not preferable due to poor exposure or unfavorable weather, for example. Furthermore, the user may forget photographing. In such a case, a preferable image can be included in the album by replacing the undesired image with another prepared image corresponding to the recommended composition or by inserting another prepared image in the image insertion area corresponding to the image whose photographing was not carried out.

BRIEF DESCRIPTION OF THE DRAWINGS

FIG. 13 is a table indicating recommended composition IDs to be used for insertion in image insertion areas of templates;

DESCRIPTION OF THE PREFERRED EMBODIMENTS

Hereinafter, embodiments of the present invention will be explained with reference to the accompanying drawings.

Figure 1:
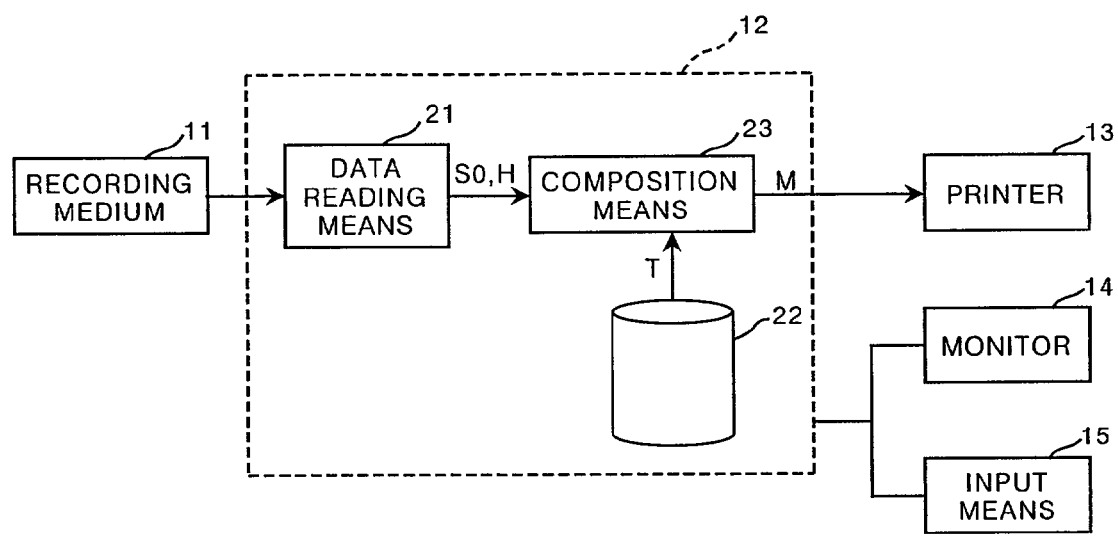
FIG. 1 is a block diagram showing a configuration of an image output system adopting an album generating apparatus as a first embodiment of the present invention.

FIG. 1 is a block diagram showing a configuration of an image output system adopting an album generating apparatus as a first embodiment of the present invention. The image output system in this embodiment is installed in a laboratory for carrying out printing based on users' requests. As shown in FIG. 1, the image output system in the first embodiment comprises album generating means 12 for generating composite image data M used for an album based on a plurality of sets of image data S0 obtained by a camera that will be explained later, a printer 13 for printing the composite image data M, a monitor 14 such as a CRT display or a liquid crystal display for displaying the image data sets S0, the composite image data M and the like, and input means 15 comprising a mouse, a keyboard and the like for carrying out various kinds of inputs to the album generating means 12.

The album generating means 12 comprises data reading means 21 for reading the image data sets S0 and accompanying information H from a recording medium 11 storing the image data sets S0 and the accompanying information H added to the image data sets by the camera, template storing means 22 for storing template data sets T representing a plurality of templates (hereinafter the templates are also called T), and composition means 23 for generating the composite image data M by arranging images represented by the image data sets S0 (hereinafter the images a real so called S0) in the templates T represented by the template data sets T read from the template storing means 22.

Figure 2:
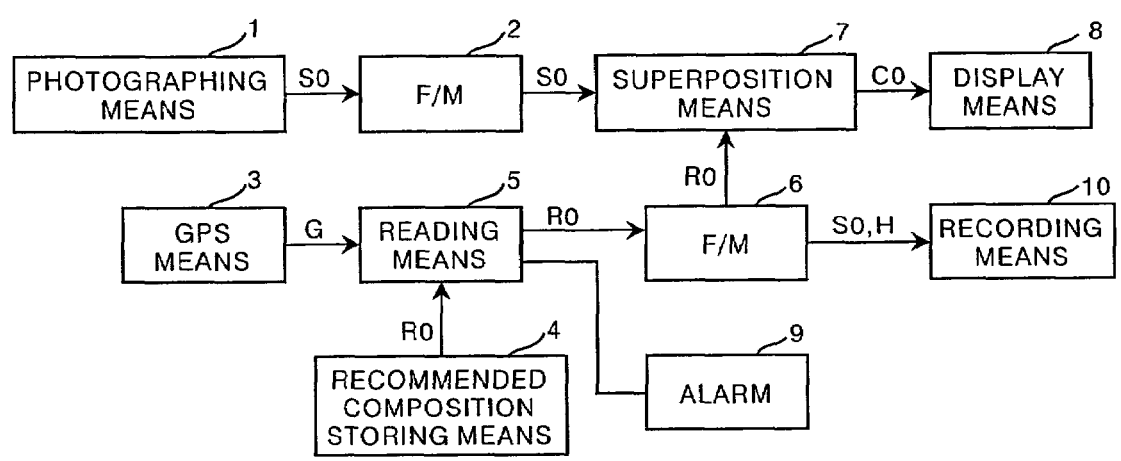
FIG. 2 is a block diagram showing a configuration of a camera used in the first embodiment.

The camera that records the image data sets S0 and the accompanying information H in the recording medium 11 will be explained below. FIG. 2 is a block diagram showing a configuration of the camera used in this embodiment. As shown in FIG. 2, the camera comprises photographing means 1 for obtaining each set of the image data S0 representing a subject by photographing the subject, a frame memory 2 for temporarily storing the image data set S0, GPS means 3 for obtaining GPS information G based on global positioning radio waves from GPS satellites, recommended composition storing means 4 for storing recommended composition data sets R0 representing a plurality of images having recommended composition at respective photographing locations by relating the recommended composition data sets R0 with location information representing the respective photographing locations, reading means 5 for reading, from the recommended composition storing means 4, one of the recommended composition data sets R0 related to the location information agreeing with the GPS information G obtained by the GPS means 3, a frame memory 6 for temporarily storing the recommended composition data set R0, superposition means 7 for obtaining superposition image data C0 by superposing the image data set S0 with the recommended composition data set R0, display means 8 for displaying the superposition image data C0, an alarm 9 for sounding an alarm when the reading means 5 reads the recommended composition data set R0, and recording means 10 for recording the image data set S0 obtained by photographing in the recording medium 11.

The photographing means 1 comprises various kinds of means necessary for photographing, such as CCDs, an imaging optical system, a shutter, a zooming mechanism, an AE mechanism, and an AF mechanism.

The GPS means 3 obtains information on the photographing location, a photographing direction, and the time and date of photographing as the GPS information G by using the global positioning radio waves from the GPS satellites. The photographing location is a position at which the camera in this embodiment is located, that is, a position where a photographer (user) is. The photographing direction refers to the direction to which the camera in this embodiment is directed.

The recommended composition storing means 4 is a portable recording medium storing the recommended composition data sets R0 classified for each photographing area or photographing purpose. The recommended composition storing means 4 is provided from the laboratory to the user and the user uses the recommended composition storing means 4 after setting the means to the camera. The recommended composition data sets R0 represent images of recommended composition to be used for photographing at sightseeing spots, for example. The recommended composition data sets R0 are stored in the recommended composition storing means 4 in relation to the location information of the recommended composition. For example, if the recommended composition storing means 4 is for Kyoto, the recommended composition images represent images of the recommended composition for photographing at sightseeing spots such as Kinkakuji temple and Kiyomizudara temple, and are related to latitude and longitude of the sightseeing spots.

The recommended composition storing means 4 stores template information indicating a desired one of the templates T to be used for generating the album. The desired template is selected by the user in advance and the template information is stored in the recommended composition storing means 4 before the recommended composition storing means 4 is provided from the laboratory to the user. As the template information, a template number can be used, for example. In this case, the recommended composition storing means 4 stores the recommended composition data sets R0 representing the composition necessary for the album, and the number of the recommended composition data sets R0 is in accordance with the number of images to be inserted in the template selected by the user.

The recommended composition storing means 4 may be a rewritable recording medium fixed to the camera so that the recommended composition data sets R0 for a photographing area or a photographing purpose desired by the photographer can be stored in the recommended composition storing means 4 by being written therein. For example, the recommended composition data sets R0 are stored in a database of the laboratory and the user accesses the database to download the desired recommended composition data sets R0. The downloaded data sets R0 are written in the recommended composition storing means 4 and stored therein.

Figure 3:
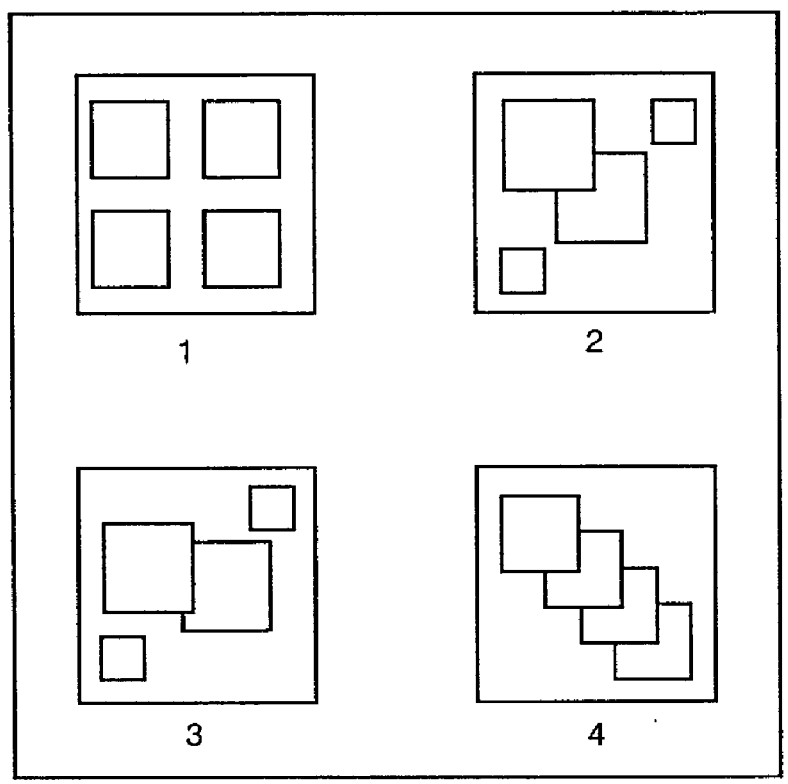
FIG. 3 shows thumbnail images of templates displayed on a personal computer of a user.

Thumbnail images of the recommended composition images in accordance with the desired photographing area or purpose may be displayed on a personal computer of the user before downloading so that the user can make a selection therefrom to download the recommended composition data sets R0. In this case, thumbnail images of the templates having the recommended composition images laid out therein are displayed on the personal computer of the user after downloading, as shown in FIG. 3. In this manner, the user selects the desired one of the templates T from the thumbnail images and the template information indicating the selected template is stored in the recommended composition storing means 4.

The templates T may be related to the recommended composition data sets R0, and the thumbnail images shown in FIG. 3 may be displayed on the personal computer of the user. After the selection of the desired thumbnail image of the template, the recommended composition data sets R0 corresponding to the selected template are downloaded in this case. Furthermore, only the recommended composition data sets R0 may be stored in the recommended composition storing means 4. In this case, the recording means 10 which will be explained later records the template information in the recording medium 11 by using input means of the camera not shown in FIG. 2.

The template information may not be recorded in the recording medium 11. In this case, the user notifies the laboratory of the template to be used. Upon generating the album, the template information is input to the album generating means 12 from the input means 15 by an operator of the laboratory.

In this embodiment, the recommended composition data sets R0 representing the recommended composition corresponding to a tour course determined in Europe and the templates using the recommended composition are stored in the recommended composition storing means 4.

The reading means 5 searches the recommended composition storing means 4 for the recommended composition data set R0 corresponding to the location information included in the GPS information G, and the reads the recommended composition data set R0 corresponding to the location information from the recommended composition storing means 4. The recommended composition data set R0 is temporarily stored in the frame memory 6.

Figure 4:
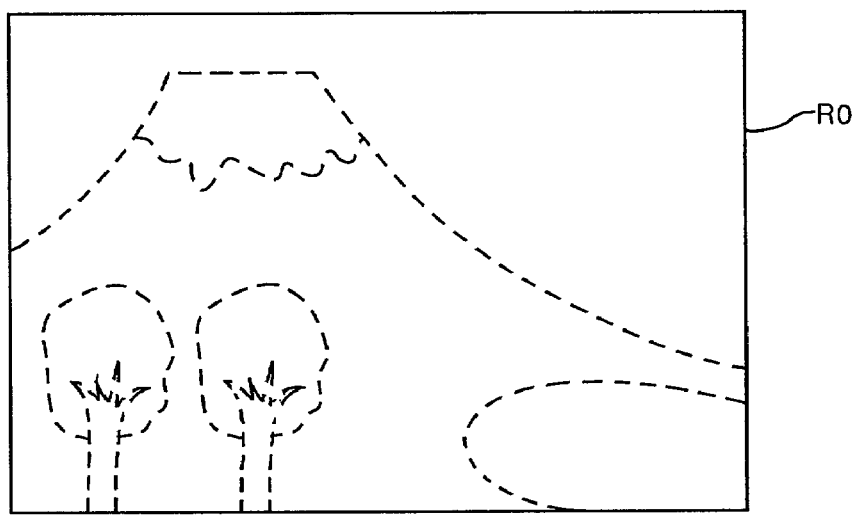
FIG. 4 shows an example of a recommended composition image.
Figure 5:
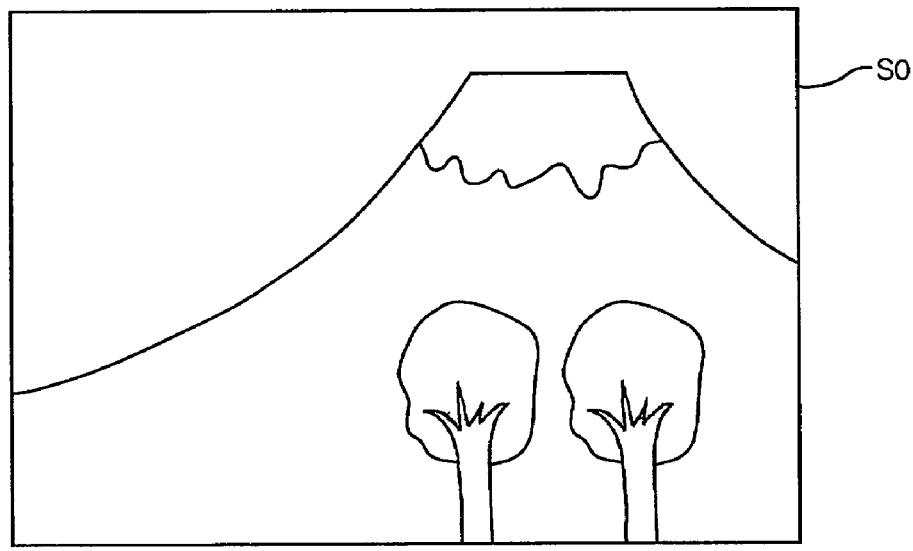
FIG. 5 shows an example of an image that is going to be photographed.
Figure 6:
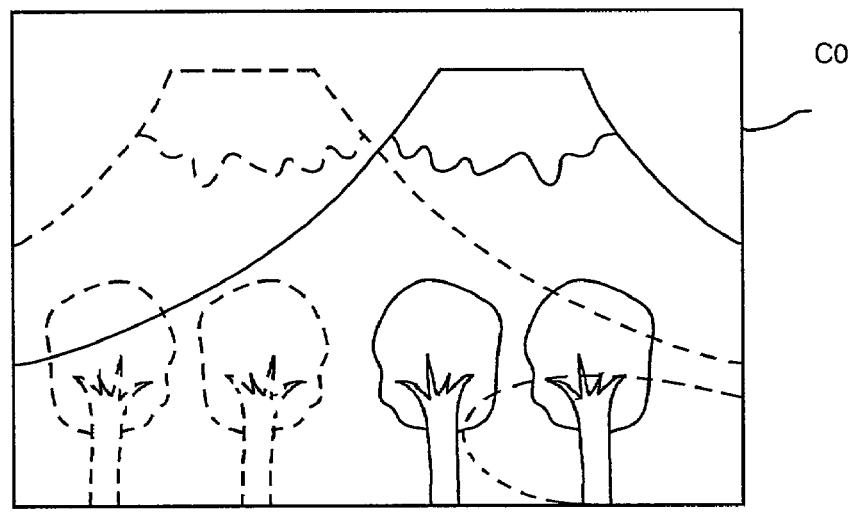
FIG. 6 shows an example of a superposition image.

The superposition means 7 obtains the superposition image data C0 by superposing the image data set S0 with the recommended composition data set R0. For example, in the case where the recommended composition image (hereinafter the recommended composition image is also called R0) represented by the recommended composition data set R0 is as shown in FIG. 4 and the image S0 represented by the image data set S0 is as shown in FIG. 5, the superposition image (hereinafter the superposition image is also called C0) represented by the superposition image data C0 obtained by the superposition means 7 is as shown in FIG. 6. The superposition image C0 is displayed on the display means 8. By setting the contrast of the recommended composition image represented by the recommended composition data set R0 lower than the contrast of the image represented by the image data set S0, the image S0 becomes easier to see. The recommended composition image may be a monochrome image or a binary image. The recommended composition images R0 may be stored in the recommended composition storing means 4 as data sets of low-contrast images, monochrome images, binary images, or images comprising outlines only, for example.

The display means 8 is a liquid crystal panel installed in the camera in this embodiment. Instead of the liquid crystal panel, a finder may be installed in the camera as the display means so that the images can be displayed therein.

The alarm 9 sounds an alarm by detecting a fact that the reading means 5 has read the recommended composition data set R0, and notifies the photographer of a fact that he/she is at the photographing location of the recommended composition. A voice may be used instead of the alarm. Alternatively, the fact that the photographer is at the location may be displayed on the display means 8, or vibration may be used to notify the photographer of the fact.

The recording means 10 records the image data set S0 obtained by photographing and the accompanying information H thereof in the recording medium 11. The accompanying information H includes the GPS information G obtained by the GPS means 3, a comment on the image displayed on the display means 8 made by the user with the input means not shown, and a file number of the image data set S0. The accompanying information H may be recorded in a file header of the image data set S0 or in the same file as the image data set S0 as in the case of a FlashPix format file, or in a file separate from the file of the image data set S0 by being related to the image data set S0.

Figure 7:
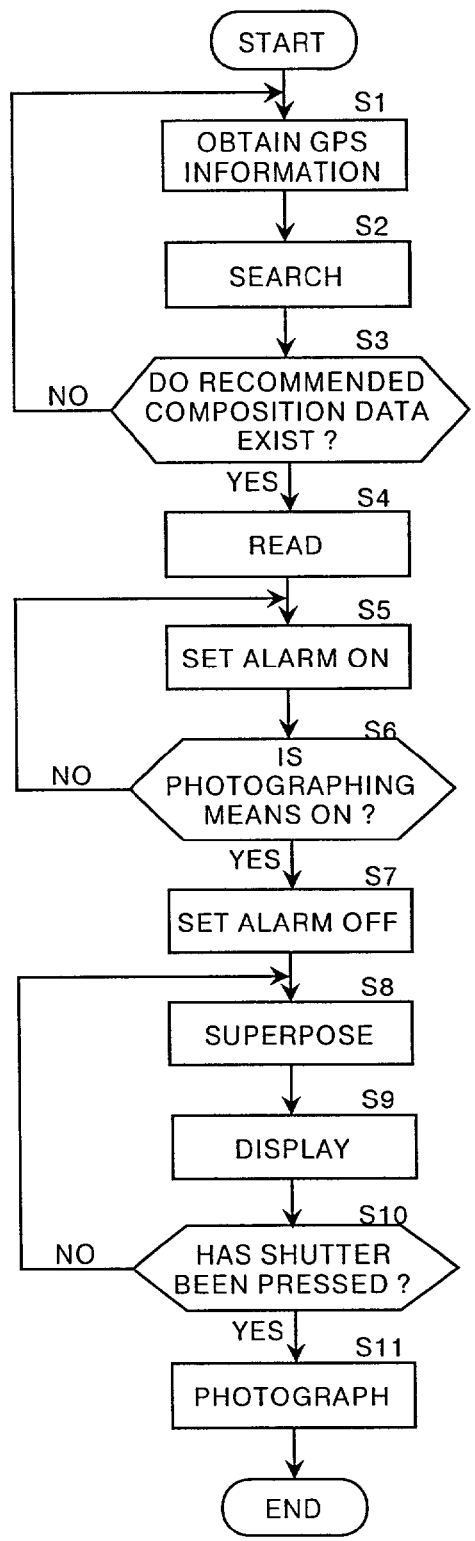
FIG. 7 is a flow chart showing operation of the camera.

Operation of the camera shown in FIG. 2 will be explained next. FIG. 7 is a flow chart showing the operation of the camera shown in FIG. 2. In this embodiment, the photographer holds the camera and the photographing means 1 is initially switched off while the GPS means 3 is on.

The GPS means 3 obtains the GPS information G based on the global positioning radio waves from the GPS satellites (Step S1). The reading means 5 searches for the recommended composition data set R0 stored in the recommended composition storing means 4 based on the location information included in the GPS information G (Step S2). Whether or not the recommended composition data set R0 corresponding to the location information of the GPS information G is stored in the recommended composition storing means 4 is judged (Step S3). When a result at Step S3 is negative, the procedure returns to Step S1, and the processing from Step S1 to S3 is repeated. When the result at Step S3 is affirmative, the recommended composition data set R0 is read from the recommended composition storing means 4 (Step S4), and input to the superposition means 7 after temporarily stored in the frame memory 6. When the recommended composition data set R0 is read from the recommended composition storing means 4, the alarm 9 alarms (Step S5). In this embodiment, the recommended composition data set R0 representing the recommended composition image shown in FIG. 4 is read. The photographer switches the photographing means 1 on after hearing the alarm (Step S6), and the alarm is turned off when the photographing means 1 is switched on (Step S7).

When the photographing means 1 is set, the image data set S0 representing the image to be photographed by the photographing means 1 is temporarily stored in the frame memory 2 while input to the superposition means 7 for real time display on the display means 8. The superposition means 7 superposes the recommended composition image R0 with the image S0 represented by the image data set S0 (Step S8), and displays the superposition image C0 shown in FIG. 6 on the display means 8 (Step S9).

The photographer adjusts the direction of photographing and the zoom function while viewing the superposition image C0 displayed on the display means 8, and causes the image S0 to agree with the recommended composition image R0. When the shutter is pressed while the image S0 is in accordance with the recommended composition image R0 (Step S10), photographing is carried out and the image data set S0 added with the accompanying information H is recorded in the recording medium 11 by the recording means 10 (Step S11) to end the procedure. Superposition and display of the image S0 to be photographed by the photographing means 1 and the recommended composition image R0 are repeatedly carried out until the shutter is pressed. If necessary, the image S0 is displayed on the display means 8 and information regarding a comment on the image S0 or regarding whether the image S0 is used for the album may be input by the input means, not shown. This information is included in the accompanying information H.

Photographing is carried out for all the recommended composition images R0, and the sets of the image data S0 corresponding to the respective recommended composition images are related to the accompanying information H and recorded in the recording medium 11. The template information stored in the recommended composition storing means 4 is read from the recommended composition storing means 4 and recorded in the recording medium 11. In the case where the template information is not recorded in the recommended composition storing means 4, the template information input from the input means not shown is recorded in the recording medium 11. The template information may be recorded in a recording medium other than the recording medium 11. In this embodiment, only the images S0 corresponding to the recommended composition images R0 are photographed and the image data sets S0 whose number agrees with the number of the recommended composition data sets R0 are recorded in the recording medium 11.

The data reading means 21 of the album generating means 12 shown in FIG. 1 reads the image data sets S0 and the accompanying information H from the recording medium 11, and inputs the image data sets S0 and the accompanying information H to the composition means 23. In the case where the template information is also recorded in the recording medium 11, the template information is also read therefrom by the data reading means 21 and input to the composition means 23. In the case where the template information is recorded in a recording medium separate from the recording medium 11, the template information is read therefrom. In the case where the template information is not recorded in either the recording medium 11 or the separate recording medium, the template information specified by the user in advance is input from the input means 15 by the operator.

Figure 8:
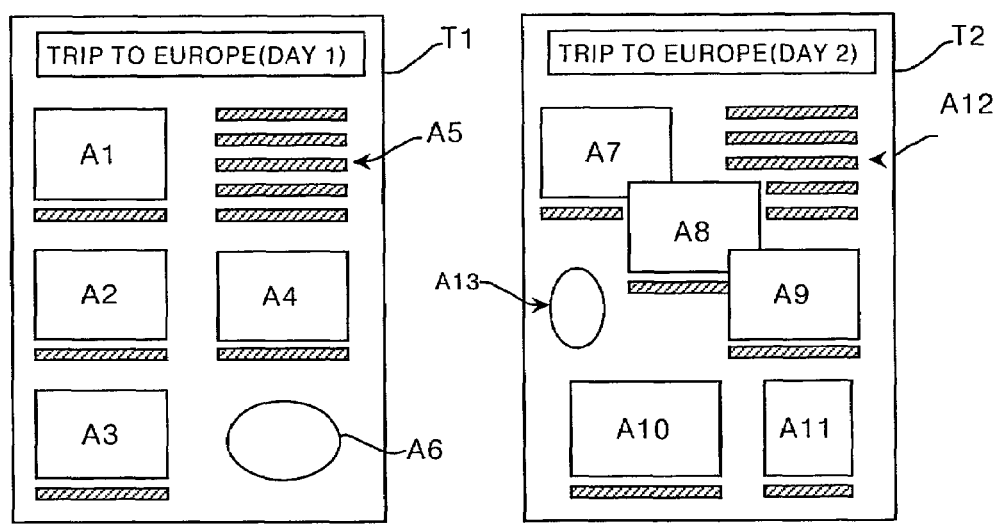
FIG. 8 shows template examples.

The composition means 23 reads the template data set representing the template corresponding to the template information. FIG. 8 shows examples of the templates T. As shown in FIG. 8, an album of a trip to Europe is generated by using two templates T1 and T2. The template T1 has four image insertion areas A1~A4, an area A5 for inserting a caption, and an area A6 for inserting a clip art. The template T2 includes five image insertion areas A7~A11, an area A12 for inserting a caption, and an area A13 for inserting a clip art. Areas for inserting the accompanying information H are also available as shown by hatched lines at the bottom of the image insertion areas in FIG. 8.

The image insertion areas A1~A4 and A7~A11 in the templates T1 and T2 are related to the accompanying information H. For example, the image data sets S0 in the recording medium 11 correspond to the tour course in the trip to Europe in this embodiment, and the order of photographing is also determined according to places to visit in the tour. Therefore, if the image data sets S0 are arranged based on the information on the photographing time and date of the accompanying information H added to the image data sets S0, the order of the image data sets S0 corresponds to the order of the places visited in the tour. Consequently, if the templates are set for image insertion in the image insertion areas A1~A4 and A7~A11 in chronological order, the images S0 obtained by the user are inserted in the templates T1 and T2 without consideration of arrangement of the images by the user, if the image data sets S0 input to the composition means 23 are simply inserted in the image insertion areas A1~A4 and A7~A11 in chronological order with reference to the accompanying information H.

The accompanying information H includes the location information representing latitude and longitude of the photographing location based on the GPS information G. Therefore, the image insertion areas A1~A4 and A7~A11 may be related to the location information so that the images S0 having the corresponding location information can be inserted in the respective image insertion areas.

The accompanying information H includes the comment made by the user, in addition to the photographing location and the time and date of photographing, for example. The accompanying information H is inserted in the areas shown by the hatched lines at the bottom of the image insertion areas A1~A4 and A7~A11. Meanwhile, the captions prepared with regard to the inserted images are inserted in the areas A5 and A12, and the clip arts are also inserted in the areas A6 and A13. The captions and the clip arts may be predetermined or selected by the user from a plurality of samples, or generated by the user.

As has been described above, the composite image data M are generated by inserting the images, the captions and the clip arts in the templates.

Since the image insertion area A10 in the template T2 is larger than the other image insertion areas, the most impressive one of the images may be inserted therein in some cases. In such a case, the image S0 desired by the user is displayed on the display means 8, and information indicating that the image S0 is inserted in the image insertion area A10 in the template T2 is input by the camera and included in the accompanying information H. In this manner, the composition means 23 can insert, in the image insertion area A10 in the template T2, the image S0 having this information in the accompanying information. In this case, the other images are inserted in chronological order in the image insertion areas excluding the image insertion area A10.

Figure 9:
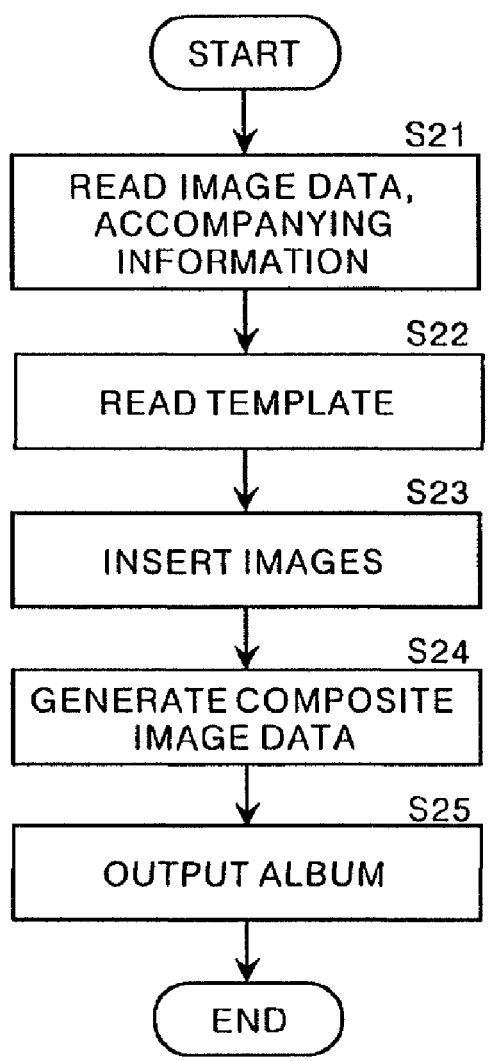
FIG. 9 is a flow chart showing operation of the first embodiment.

Operation of this embodiment will be explained next. FIG. 9 is a flow chart showing the operation of this embodiment. The data reading means 21 reads the image data sets S0 and the accompanying information H thereof from the recording medium 11 (Step S21). The image data sets S0 and the accompanying information H are input to the composition means 23. The composition means 23 reads the templates from the template storing means 22 based on the template information stored in the recording medium 11 or input from the input means 15 or the like (Step S22). The images S0 represented by the image data sets S0 are inserted in the templates based on the accompanying information H (Step S23), and the captions and the clip arts are also inserted to generate the composite image data M (Step S24). The composite image data M are input to the printer 13 and output as the album (Step S25) to end the procedure.

As has been described above, in this embodiment, the image data sets S0 of the images corresponding to the recommended composition to be inserted in the templates are obtained by the camera shown in FIG. 2, and recorded in the recording medium 11 together with the accompanying information H thereof. The image data sets S0 and the accompanying information H are read from the recording medium 11, and the images S0 represented by the image data sets S0 are arranged in the templates based on the accompanying information H. Since the image insertion areas of the templates are related to the accompanying information H added to the image data sets S0, the composition means 23 generates the composite image data M by inserting, in the image insertion areas, the images S0 having the accompanying information H corresponding to the respective image insertion areas of the templates. Therefore, the user can obtain the album having the photographed images arranged therein, by simply selecting the templates and photographing the images in accordance with the recommended composition, without selecting the images and the layout thereof. In this manner, the user can spare time upon album generation.

Figure 10:
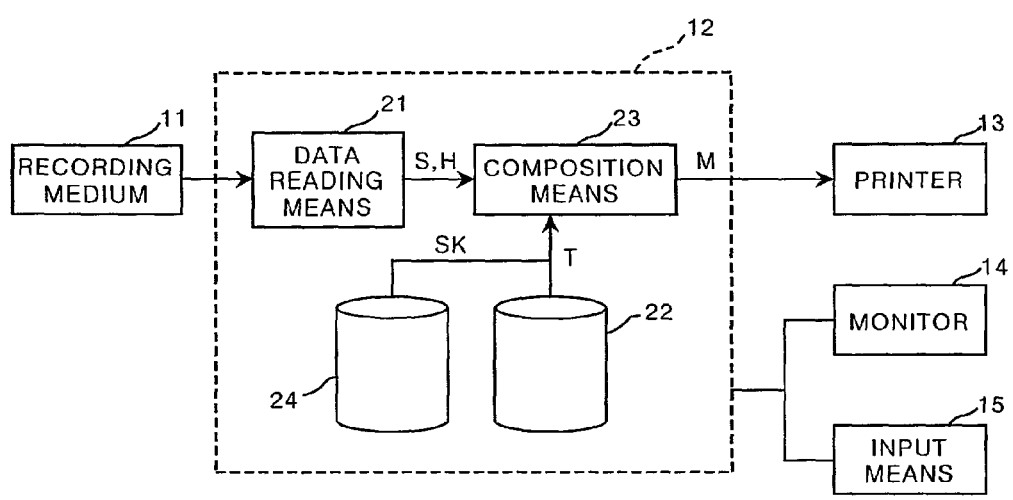
FIG. 10 is a block diagram showing a configuration of an image output system adopting an album generating apparatus as a second embodiment of the present invention.

A second embodiment of the present invention will be explained next. FIG. 10 is a block diagram showing a configuration of an image output system adopting an album generating apparatus as the second embodiment of the present invention. In the second embodiment, the same elements as the elements in the first embodiment have the same reference numerals, and detailed explanation thereof is omitted. In the second embodiment, storage means 24 is used for storing image data sets SK representing images corresponding to recommended composition and photographed in a preferable condition. Composite image data M generated by composition means 23 are temporarily displayed on a monitor 14 and a composite image is confirmed thereby. In the case where an undesired image is included in the composite image, the image is replaced with one of the images photographed in a preferable condition.

For example, if a tour course includes the Louvre and the recommended composition image at the Louvre is Mona Lisa, photographing the painting of Mona Lisa is desired. However, the painting is in the museum and use of flash is not allowed. Therefore, only a dark image of Mona Lisa may be obtained when photographing is actually carried out. For this reason, one of the image data sets SK representing the painting of Mona Lisa obtained by using a bright lens and a high-speed film is prepared in the storage means 24. If the photographed image of Mona Lisa is not preferable when the composite image is confirmed on the monitor 14, the image is replaced with the image represented by the image data set SK.

Meanwhile, in the case where Mout Blanc is included in the tour course but the mountain is covered with cloud at the time of photographing due to changeable mountain weather, or in the case where a desired image of the mountain cannot be obtained due to unfavorable weather, one of the image data sets SK representing an image of Mout Blanc obtained by photographing in a preferable weather at almost the same time of the day and year is prepared in the storage means 24, and the undesired image of Mont Blanc is replaced with the image represented by the image data set SK when the composite image is confirmed on the monitor 14.

By replacing the undesired image in the composite image with the image obtained in a preferable condition, the album giving a preferable impression can be generated.

In the above embodiments, the alarm 9 of the camera notifies the photographer of the location of the recommended composition. However, photographing the image of the recommended composition may be forgotten in some cases. Therefore, when the images are inserted in the image insertion areas of the templates in chronological order upon generating the album, the last image insertion area (for example, the insertion area A11 of the template T2) is not filled when a photographing chance is missed for one of the images to be inserted. In this case, the empty insertion area may be left as it is. However, it is preferable for the blank insertion area to be filled with a preferable image prepared in advance.

In the case where the images are inserted in the image insertion areas of the templates based on the location information, if a photographing opportunity of the image to be inserted in the image insertion area A7 of the template T2 is missed for example, the image insertion area A7 becomes blank. In this case, the image insertion area A7 may stay blank. However, the image insertion area A11 may become blank by shifting the images to be inserted in the image insertion areas A8 to A11 one by one. Alternatively, as in the second embodiment, one of the images photographed in a preferable condition may be inserted in the image insertion area A7.

Figure 11:
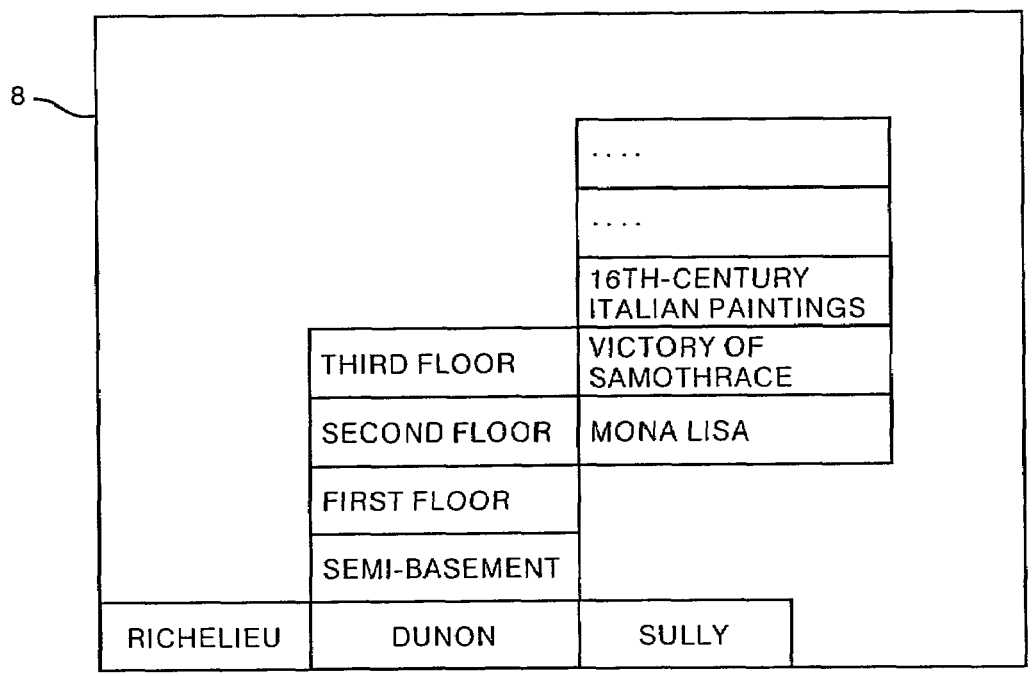
FIG. 11 shows a menu for selecting recommended composition.

In the above embodiments, if the recommended composition image R0 is an image in a building such as a museum, the global positioning radio waves from the GPS satellites may not be received by the GPS means 3 of the camera. In such a case, the display means 8 cannot display the recommended composition image R0. Therefore, a selection menu of the recommended composition images R0, such as a menu shown in FIG. 11, may be displayed on the display means 8 when the GPS means 3 does not detect the radio waves. For example, if the photographer enters the Louvre, his/her entrance can be detected by the GPS means 3. Therefore, a selection mode of the recommended composition images R0 for the Louvre is displayed on the display means 8, as shown in FIG. 11. Since the Louvre has three buildings, namely Richelieu, Denon, and Sully, pull-down menus for these are displayed. Denon is selected therefrom, for example, and "second floor" is further selected. A menu including Mona Lisa, Victory of Samothrace, 16th-century Italian paintings, and the like exhibited on the second floor of Denon is then displayed. When the photographer selects Mona Lisa, for example, the recommended composition image of Mona Lisa is displayed on the display means 8. Therefore, the photographer can photograph the image of the recommended composition even if the GPS means 3 cannot receive the global positioning radio waves.

Furthermore, in the above embodiments, only the image data sets S0 whose quantity agrees with the number of the image insertion areas of the templates are recorded in the recording medium 11 by the camera. However, a plurality of images may be photographed for any one of the recommended composition images. Moreover, the photographer may photograph images without using the recommended composition. In such a case, the images are displayed on the display means 8 of the camera, and the user selects a desired one of the images. Information indicating that the image is used for the album is added to the accompanying information H corresponding to the image data set representing the image. In this manner, the composition means 23 generates the composite image data M by using only the image data sets S0 having this information in the accompanying information H.

Moreover, in the above embodiments, the images are inserted in the image insertion areas of the templates in chronological order based on the information of the photographing time and date. However, this order can be changed arbitrarily. More specifically, the images are displayed on the display means 8 of the camera and information indicating the insertion order is included in the accompanying information H. The composition means 23 inserts the images in the image insertion areas of the templates based on the information indicating the insertion order.

In the above embodiments, the template data sets T are stored in the template storing means 22, and the template data sets corresponding to the template information are read therefrom. However, the template data sets may be recorded in the recording medium 11 so that the data reading means 21 can read the template data sets in addition to the image data sets S0 and the accompanying information H. Alternatively, the template data sets may be recorded in a recording medium other than the recording medium 11 so that the data reading means 21 can read the template data sets from the recording medium. In this case, the template data sets may be stored in the personal computer of the user or provided from the laboratory to the user by being recorded in a recording medium or via a network. The template data sets may also be provided to the user by being recorded in the recommended composition storing means 4.

In the above embodiments, the template number is used as the template information. However, file names of the templates T can also be used.

In the above embodiments, the album is generated by using the image data sets S0 obtained by the camera shown in FIG. 2 for carrying out photographing according to the recommended composition based on the GPS information G. However, the image data sets used for album generation are not limited to the image data sets obtained by such a camera. For example, since image data obtained by a digital camera have information on the photographing time and date, this information can be used as the accompanying information H for inserting images in the templates as in the above embodiments. In this case, by adding information indicating future use for album generation to the image data to be inserted in the templates, the composition means 23 can read the accompanying information H and generate the composite image data M by using the image data sets S0 having the information indicating the use.

In the above embodiment, the templates are pre-selected and photographing is carried out according to the layout of the templates. However, the templates may be selected for the album after photographing is carried out based on the recommended composition. Hereinafter, this example will be explained as a third embodiment.

Figure 12:
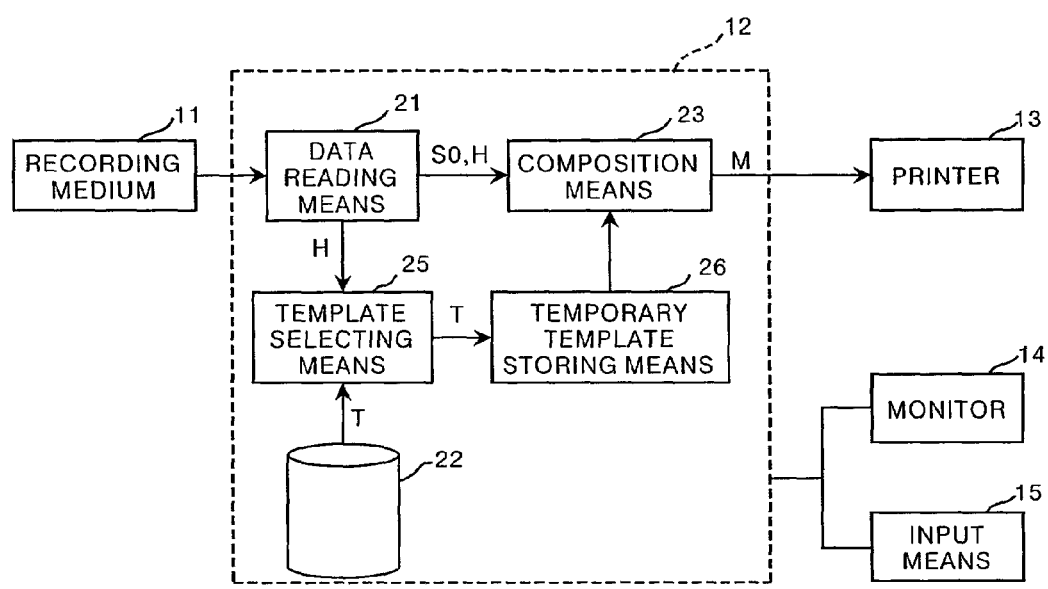
FIG. 12 is a block diagram showing a configuration of an image output system adopting an album generating apparatus as a third embodiment of the present invention.

FIG. 12 is a block diagram showing a configuration of an image output system adopting an album generating apparatus as the third embodiment of the present invention. In the third embodiment, the same elements as in the first embodiment have the same reference numerals and detailed explanation thereof is omitted. In the third embodiment, the image output system comprises template selecting means 25 for selecting one of templates T to be used for generation of composite image data M from the templates stored in template storing means 22 based on accompanying information H read by data reading means 21, and temporary template storing means 26 for temporarily storing the selected template T. Based on the accompanying information H, the template T is selected and the composite image data M are generated based on the selected template T.

In the third embodiment, recommended composition data sets R0 related to the accompanying information H having recommended time and weather for photographing and a recommended photographing condition are stored in recommended composition storing means 4 of a digital camera. One of the recommended composition data sets R0 corresponding to a photographing location, photographing time and/or weather is read based not only on location information included in GPS information G but also time information and weather information at the time of photographing, and image data S0 are obtained by photographing according to the recommended composition data set. At this time, the accompanying information H includes a recommended composition ID for specifying the recommended composition data set R0 used for photographing, the GPS information G, the weather information at the time of photographing, and the photographing condition. Each of the templates T is stored in the template storing means 22 in a state where the recommended composition ID for specifying a recommended composition image to be inserted in an image insertion area thereof is related to the template as accompanying information H0 of the template. The accompanying information H0 is added to tag information of the corresponding template.

The recommended composition ID represents a location at which photographing using the recommended composition data set is recommended and a recommended composition number at the location. For example, let a, b, c, . . . represent a location x and let 1, 2, 3, . . . represent a composition number i. The recommended composition ID for the recommended composition data set can be expressed as Fxi. If an identifier of each of the templates T is I, II, III, . . . , and if image insertion areas thereof are expressed as (1), (2), (3), . . . , each of the templates T is stored in the template storing means 22 with each of the image insertion areas thereof being related to the recommended composition ID to be inserted in the image insertion area, as shown in a table in FIG. 13.

Figure 14:
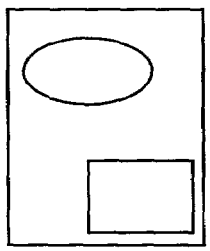
FIG. 14 shows an example of description of accompanying information in a template.

For example, information corresponding to a row of a template I in the table in FIG. 13 is added to the template I as the accompanying information H0. More specifically, as shown in FIG. 14, the accompanying information H0 is described in the tag information of the template I. According to the accompanying information H0, the template I has two image insertion areas (1) and (2). The image insertion area (1) is related to a recommended composition ID (Fa1) of a composition number 1 at a location a, or to a recommended composition ID (Fc1) of the composition number 1 at a location c. The image insertion area (2) is related to a recommended composition ID (Fb1) of the composition number 1 at a location b, or to a recommended composition ID (Fd1) of the composition number 1 at a location d. A recommended season and recommended weather are related to all seasons (all) and all types of weather (all).

Figure 15:
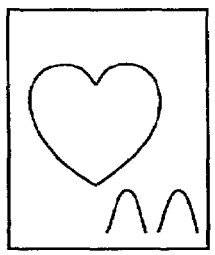
FIG. 15 shows another example of description of the accompanying information in a template.

Meanwhile, the accompanying information H0 of a template VI is as shown in FIG. 15. According to the accompanying information H0, the template VI has one image insertion area (1). The image insertion area (1) is related to a recommended composition ID (Ff1) of the composition number 1 at a location f in rain or fine weather (w=r or s [weather=rain or sunny]) in winter (s=w [season=winter]), or to a recommended composition ID (Fa3) of a composition number 3 at the location a in fine weather (w=s [weather=sunny]) in winter (s=w [season=winter]).

In the third embodiment, a photographer recorded six image data sets S0 in a recording medium 11 by photographing using the recommended composition 1 at locations a, b, c, d, e, and f. In this case, recommended composition IDs Fa1, Fb1, Fc1, Fd1, Fe1, and Ff1 are added to the image data sets S0 as the accompanying information H. The data reading means 21 reads the six image data sets S0 and the accompanying information H added thereto, and the accompanying information H is input to the template selecting means 25. The template selecting means 25 reads two templates I and III from the template storing means 22 based on the accompanying information H, and inputs the templates to the temporary template storing means 26. At the time of generating the composite image data, the template I is used twice. Composition means 23 generates the composite image data M representing an album comprising three pages, based on the two templates I, the template III and six image data sets S0.

In this case, images whose recommended composition numbers are 1 at the locations a and b are respectively inserted in the image insertion areas (1) and (2) of the template I, while images whose recommended composition numbers are 1 at the locations c and d are inserted in the image insertion areas (1) and (2) of the other template I. Images whose recommended composition numbers are 1 at the locations e and f are also inserted in the image insertion areas (1) and (2) of the template III.

Meanwhile, if the photographer records seven image data sets S0 in the recording medium 11 by photographing at the locations a and b according to the recommended composition 1, at the location d according to recommended compositions 1, 2, and 3, and at a location g according to the recommended compositions 1 and 2. In this case, the template selecting means 25 reads three templates I, II, and III from the template storing means 22, and the templates are temporarily stored in the temporary template storing means 26. The composition means 23 generates the composite image data M representing the album having three pages, based on the three templates I, II, and III, and the seven image data sets S0.

In this case, images whose recommended composition numbers are 1 at the locations a and b are respectively inserted in the image insertion areas (1) and (2) of the template I, while images whose recommended composition numbers are 2, 1, and 3 at the location d are respectively inserted in the image insertion areas (1), (2), and (3) of the template II. Images whose recommended composition numbers are 2 and 1 at the location g are also inserted in the image insertion areas (1) and (2) of the template III.

The template T may simply be selected based on the recommended composition ID. However, some combinations of templates are not preferable with regard to layout. In this case, it is preferable for the undesired combinations (or preferable combinations) to be stored in a memory (not shown) of the template selecting means 25 so that the undesired template combinations cannot be selected.

In the above embodiment, photographing is carried out to cause the image to agree with the recommended composition based on the GPS information G. However, instead of the GPS information G, global position information judged by a PHS reception area may be used for the photographing.

In the above embodiments, the image data sets S0 and the accompanying information H are recorded in the recording medium 11 and provided for album generation. However, the image data sets S0 and the accompanying information H thereof may be stored in the personal computer of the user so that the image data sets S0 and the accompanying information H can be read from the personal computer of the user via a network connecting the data reading means 21 and the personal computer.

What is claimed is:

1. A method of generating an album comprising a composite image in which a plurality of images obtained by a digital camera are arranged in a desired layout, the images being obtained according to desired ones of recommended composition data sets stored in the digital camera, the digital camera comprising image recording means for recording image data sets representing the images in a recording medium with accompanying information regarding the image data sets added thereto, the album generation method comprising the steps of:

reading the image data sets obtained according the desired ones of the recommended composition data sets stored in the digital camera and the accompanying information added thereto from the recording medium; and generating composite image data representing the composite image based on the accompanying information by inserting the respective images represented by the image data sets in image insertion areas of a template having the image insertion areas corresponding to the accompanying information, wherein the template includes thumbnail images of the recommended composition data sets, and the templates are selected by a user of the digital camera and are downloaded into the digital camera prior to obtaining the images.

2. An album generation method as defined in claim 1, wherein the template is selected based on the accompanying information.

3. An album generation method as defined in claim 2, wherein the step of generating the composite image data is the step of generating the composite image data by inserting the accompanying information in the template, in addition to the images.

4. An album generation method as defined in claim 1, wherein the step of generating the composite image data is the step of generating the composite image data by inserting the accompanying information in the template, in addition to the images.

5. An album generation method as defined in any one of claims 1 to 3, the digital camera further comprising:

photographing means for obtaining image data representing a subject by photographing the subject;

storage means for storing the recommended composition data sets, the recommended composition data sets representing images of recommended composition at various photographing locations by relating photographing information including location information representing the photographing locations to the recommended composition data sets;

photographing information obtaining means for obtaining acquired photographing information;

reading means for reading the desired one of the recommended composition data sets related to the photographing information corresponding to the acquired photographing information from the storage means, based on the acquired photographing information obtained by the photographing information obtaining means, wherein the image recording means is means for including the acquired photographing information in the accompanying information, for adding the accompanying information to the image data obtained by the photographing means based on the recommended composition, and for recording a plurality of sets of the image data having the accompanying information in the recording medium.

6. An album generation method as defined in claim 5, further comprising the step of replacing the image data obtained according to the desired ones of the recommended composition data sets with prepared image data corresponding to the desired one of the recommended composition data sets.

7. An album generation method as defined in claim 1, wherein the accompanying information includes information indicating whether or not each of the image data sets is used for an album.

8. An album generation method as defined in claim 1, wherein the template is read out from template storage means for storing a plurality of templates, with reference to the information specifying the template, which is recorded on the recording medium.

9. An album generation method as defined in claim 1, further comprising the steps of:

obtaining each of the images according to the desired ones of the recommended composition data sets stored in the digital camera by:

adjusting a direction of the digital camera while viewing the recommended composition image represented by a corresponding one of the desired ones of the recommended composition data sets, thereby causing the desired one of the recommended composition data sets and the image to be obtained to be superimposed on a display means of the digital camera in a manner that is viewable by the user of the digital camera, and performing a photographing operation with the digital camera when the image to be obtained is confirmed by the user to be in accordance with the corresponding desired one of the recommended composition data sets; and storing the image data sets thus obtained in the recording medium of the digital camera.

10. An album generating apparatus for generating an album comprising a composite image in which a plurality of images obtained by a digital camera are arranged in a desired layout, the images being obtained according to desired ones of recommended composition data sets stored in the digital camera, the digital camera comprising image recording means for recording image data sets representing the images and having accompanying information regarding the image data sets in a recording medium, the album generating apparatus comprising:

reading means for reading the image data sets obtained according the desired ones of the recommended composition data sets stored in the digital camera and the accompanying information added thereto from the recording medium; and composition means for generating composite image data representing the composite image based on the accompanying information by inserting the respective images represented by the image data sets into image insertion areas of a template having the image insertion areas corresponding to the accompanying information, wherein the template includes thumbnail images of the recommended composition data sets, and the templates are selected by a user of the digital camera and are downloaded into the digital camera prior to obtaining the images.

11. An album generating apparatus as defined in claim 10, further comprising template selecting means for selecting the template based on the accompanying information.

12. An album generating apparatus as defined in claim 11, wherein the composition means generates the composite image data by inserting the accompanying information together with the images in the template.

13. An album generating apparatus as defined in claim 10, wherein the composition means generates the composite image data by inserting the accompanying information together with the images in the template.

14. An album generating apparatus as defined in any one of claims 10 to 12, the digital camera further comprising:

photographing means for obtaining image data representing a subject by photographing the subject;

storage means for storing the recommended composition data sets, the recommended composition data sets representing images of recommended composition at various photographing locations by relating photographing information including location information representing the photographing locations to the recommended composition data sets;

photographing information obtaining means for obtaining acquired photographing information;

the reading means for reading the desired one of the recommended composition data sets related to the photographing information corresponding to the acquired photographing information from the storage means, based on the acquired photographing information obtained by the photographing information obtaining means wherein the image recording is being means for including the acquired photographing information in the accompanying information, for adding the accompanying information to the image data obtained by the photographing means based on the recommended composition, and for recording a plurality of sets of the image data having the accompanying information in the recording medium.

15. An album generating apparatus as defined in claim 14, wherein the composition means enables replacement of the image data obtained according to the desired ones of the recommended composition data sets with prepared image data corresponding to the desired one of the recommended composition data sets.

16. An album generating apparatus as defined in claim 10, wherein the accompanying information includes information indicating whether or not each of the image data sets is used for an album.

17. An album generating apparatus as defined in claim 10, wherein the template is read out from template storage means for storing a plurality of templates, with reference to the information specifying the template, which is recorded on the recording medium.

18. An album generating apparatus as defined in claim 10, wherein the digital camera includes:

display means for enabling the user of the digital camera to adjust a direction of the digital camera while viewing the recommended composition image represented by a corresponding one of the desired ones of the recommended composition data sets, thereby causing the desired one of the recommended composition data sets and the image to be obtained to be superimposed on a display means of the digital camera in a manner that is viewable by a user of the digital camera, and photographing means for enabling the user to perform a photographing operation with the digital camera when the image to be obtained is confirmed by the user to be in accordance with the corresponding desired one of the recommended composition data sets, wherein the image data sets thus obtained are stored in the recording medium for subsequent reading by the reading means.

19. A computer-readable recording medium storing a program to cause a computer to execute an album generation method for generating an album comprising a composite image in which a plurality of images obtained by a digital camera are arranged in a desired layout, the images being obtained according to desired ones of recommended composition data sets stored in the digital camera, the digital camera comprising image recording means for recording image data sets representing the images and having accompanying information regarding the image data sets in a recording medium, the program comprising the procedures of:

reading the image data sets obtained according the desired ones of the recommended composition data sets stored in the digital camera and the accompanying information added thereto from the recording medium; and generating composite image data representing the composite image based on the accompanying information by inserting the respective images represented by the image data sets in image insertion areas of a template having the image insertion areas corresponding to the accompanying information, wherein the template includes thumbnail images of the recommended composition data sets, and the templates are selected by a user of the digital camera and are downloaded into the digital camera prior to obtaining the images.

20. A computer-readable recording medium as defined in claim 19, wherein the template is selected based on the accompanying information.

21. A computer-readable recording medium as defined in claim 20, the procedure of generating the composite image data being the procedure of generating the composite image data by inserting the accompanying information together with the images in the template.

22. A computer-readable recording medium as defined in claim 19, the procedure of generating the composite image data being the procedure of generating the composite image data by inserting the accompanying information together with the images in the template.

23. A computer-readable recording medium as defined in any one of claims 19 to 21, the digital camera further comprising:

photographing means for obtaining image data representing a subject by photographing the subject;

storage means for storing the recommended composition data sets, the recommended composition data sets representing images of recommended composition at various photographing locations by relating photographing information including location information representing the photographing locations to the recommended composition data sets;

photographing information obtaining means for obtaining acquired photographing information;

reading means for reading the desired one of the recommended composition data sets related to the photographing information corresponding to the acquired photographing information from the storage means, based on the acquired photographing information obtained by the photographing information obtaining means wherein the image recording means is means for including the acquired photographing information in the accompanying information, for adding the accompanying information to the image data obtained by the photographing means based on the recommended composition, and for recording a plurality of sets of the image data having the accompanying information in the recording medium.

24. A computer-readable recording medium as defined in claim 23, the program further comprising the procedure of replacing the image data obtained according to the desired ones of the recommended composition data sets with prepared image data corresponding to the desired one of the recommended composition data sets.

25. A computer-readable recording medium as defined in claim 19, wherein the accompanying information includes information indicating whether or not each of the image data sets is used for an album.

26. A computer-readable recording medium as defined in claim 19, wherein the template is read out from template storage means for storing a plurality of templates, with reference to the information specifying the template, which is recorded on the recording medium.

27. A computer-readable recording medium as defined in claim 19,
wherein obtaining each of the images according to the desired ones of the recommended composition data sets stored in the digital camera includes the steps of:
adjusting a direction of the digital camera while viewing the recommended composition image represented by a corresponding one of the desired ones of the recommended composition data sets, thereby causing the desired one of the recommended composition data sets and the image to be obtained to be superimposed on a display means of the digital camera in a manner that is viewable by the user of the digital camera, performing a photographing operation with the digital camera when the image to be obtained is confirmed by the user to be in accordance with the corresponding desired one of the recommended composition data sets; and storing the image data sets thus obtained in the recording medium for subsequent reading.

\* \* \* \* \*